(12) United States Patent
Stribrny et al.

(10) Patent No.: US 11,655,041 B2
(45) Date of Patent: May 23, 2023

(54) ELECTRONIC RELEASE SYSTEMS AND METHODS FOR EJECTION SEATS

(71) Applicant: AMI Industries, Inc., Colorado Springs, CO (US)

(72) Inventors: Casey Stribrny, Colorado Springs, CO (US); Nicholas Bharucha, Colorado Springs, CO (US); Steven Holstine, Colorado Springs, CO (US); Jackson Fulcher, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 17/461,559

(22) Filed: Aug. 30, 2021

(65) Prior Publication Data

US 2023/0062602 A1 Mar. 2, 2023

(51) Int. Cl.
*B64D 25/10* (2006.01)
*B64D 25/06* (2006.01)

(52) U.S. Cl.
CPC ............. *B64D 25/10* (2013.01); *B64D 25/06* (2013.01)

(58) Field of Classification Search
CPC ................................ B64D 25/10; B64D 25/06
See application file for complete search history.

(56) References Cited

U.S. PATENT DOCUMENTS

| | | | |
|---|---|---|---|
| 2,494,207 A | 1/1950 | Sabbia | |
| 2,689,697 A * | 9/1954 | Stanley | B64D 25/06 89/1.14 |
| 2,861,760 A | 11/1958 | Smiths | |
| 2,892,602 A * | 6/1959 | Servanty | B64D 25/10 244/141 |
| 2,924,406 A | 2/1960 | Hildebrand et al. | |

* cited by examiner

*Primary Examiner* — Richard G Davis
(74) *Attorney, Agent, or Firm* — Snell & Wilmer L.L.P.

(57) ABSTRACT

An electronic release system for an aircraft ejection system may comprise: a controller; a plurality of release devices in operable communication with the controller; a plurality of pins, each pin in the plurality of pins operably coupled to a release device in the plurality of release devices, the controller configured to: receive an indication that an ejection event from an aircraft has been initiated, command activation of the plurality of release devices, and in response to commanding the activation, releasing the plurality of pins from an ejection seat.

20 Claims, 5 Drawing Sheets

ELECTRONIC RELEASE SYSTEMS AND METHODS FOR EJECTION SEATS

FIELD

The present disclosure relates to aircraft ejection seats, and more specifically, to lateral support systems for aircraft ejection seats.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes, and aircraft attitudes. After a predetermined interval from ejection of an ejection seat, an occupant separates from the ejection seat in response to pins (e.g., lap belt pins) being retracted. Typical ejection systems include mechanical linkages, which add weight and cost to ejection seats and ejection systems.

SUMMARY

An electronic release system for an aircraft ejection system is disclosed herein. The electronic release system comprises: a controller; a plurality of release devices in operable communication with the controller; a plurality of pins, each pin in the plurality of pins operably coupled to a release device in the plurality of release devices, the controller configured to: receive an indication that an ejection event from an aircraft has been initiated, command activation of the plurality of release devices, and in response to commanding the activation, releasing the plurality of pins from an ejection seat.

In various embodiments, the electronic release system further comprises the ejection seat. The plurality of pins may include a first pin configured to release a lap belt during releasing the plurality of pins. The plurality of pins may include a second pin configured to release a leg restraint during releasing the plurality of pins. Releasing each pin in the plurality of pins may occur within one second of each other. The controller may be further configured to receive a second indication a predetermined time has elapsed since the ejection event was initiated. The electronic release system may further comprise a lap belt, a first pin in the plurality of pins configured to secure the lap belt during operation of the aircraft. An aircraft may comprise the electronic release system.

An electronic release system for an aircraft ejection system is disclosed herein. The electronic release system may comprise: a controller; a maintenance electrical port in electrical communication with the controller; a plurality of pins configured to be released during an ejection event; a plurality of release devices in electronic communication with the controller, each release device in the plurality of release devices in operable communication with a pin in the plurality of pins, the controller configured to: receive a command to release a first release device in the plurality of release devices; and command release of the first release device in the plurality of release devices, a remainder plurality of release devices remaining un-released.

In various embodiments, the controller is further configured to: receive an indication that the ejection event from an aircraft has been initiated, command activation of the plurality of release devices, and in response to commanding the activation, releasing the plurality of pins from an ejection seat. Releasing each pin in the plurality of pins may occur within one second of each other. The electronic release system may further comprise an ejection seat, the controller disposed within the ejection seat. The plurality of pins may include a first pin configured to release a lap belt during releasing the plurality of pins. The controller may further be configured to: receive a second command to close the first release device; and command the first release device to close in response to receiving the second command.

A method is disclosed herein. The method may comprise: receiving, via a processor, an indication that an ejection event from an aircraft is initiated; commanding, via the processor, activation of a plurality of release devices to supply a retraction force to a plurality of pins; and in response to activation of the plurality of release devices, releasing the plurality of pins from an ejection seat of the aircraft.

An occupant may be released from the ejection seat in response to releasing the plurality of pins. Releasing each pin in the plurality of pins may occur within one second of a remainder of pins in the plurality of pins being released. The method may further comprise receiving, via the processor, a predetermined time has elapsed since the ejection event was initiated. Commanding activation of the plurality of release devices may be in response to the predetermined time elapsing. The plurality of pins may be configured to release a lap belt, a leg restraint, a shoulder harness, an arm restraint release, a helmet mounted display release, a passive head and neck protection release, etc.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Ejection seats typically include cartridge activated devices/propellant actuated devices (CAD/PAD) to power a thruster associated with mechanical linkages for retracting a plurality of pins during an ejection process. For example, the mechanical linkages may include a bell crank and additional linkages, which may add significant weight to an ejection system. The thruster may be configured to provide greater force due to retracting multiple pins simultaneously rather than a single pin and having to overcome various load conditions for each pin location, which may add additional weight to the ejection seat system.

Disclosed herein is electric restraint release systems and methods for aircraft ejection systems. In various embodiments, the electric restraint release system facilitates electronic activation of the plurality of pins during an ejection process. The electronic activation may include wired or wireless retraction of the plurality of pins during the ejection process. In this regard, electronically controlled pins may be utilized to reduce weight, cost, and/or improve efficiency of ejection systems, in accordance with various embodiments.

Figure 1:
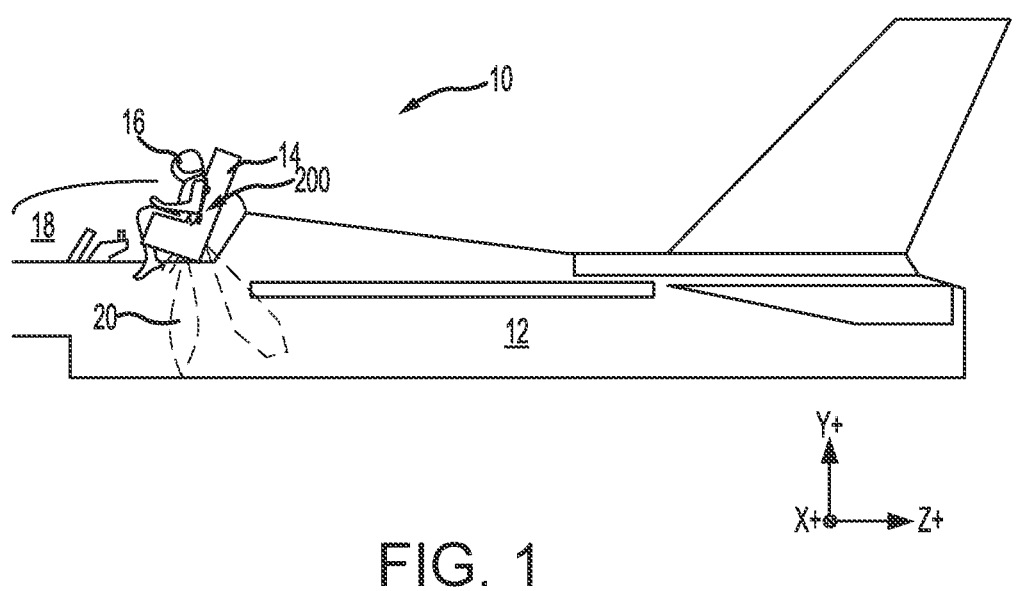
FIG. 1 illustrates an aircraft ejection system, in accordance with various embodiments.

With reference to FIG. 1, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes an electronic release system 200. The electronic release system 200 may be operably coupled to, a plurality of pins configured to release an occupant 16 from an ejection seat. The electronic release system 200 may be configured to initiate a release process via a control system, in accordance with various embodiments, as disclosed further herein.

Figure 2B:
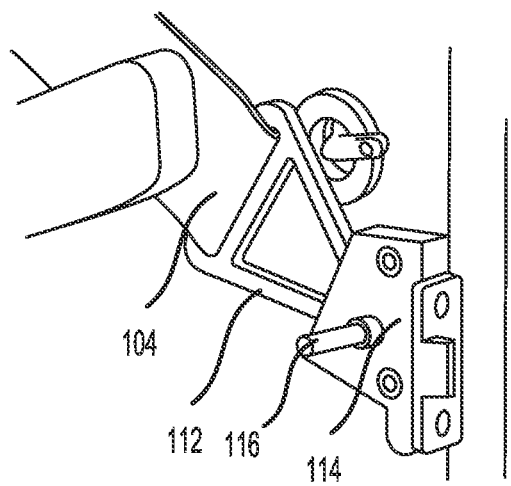
FIG. 2B illustrates a detail view of an ejection seat having an electronic release system, in accordance with various embodiments
Figure 2A:
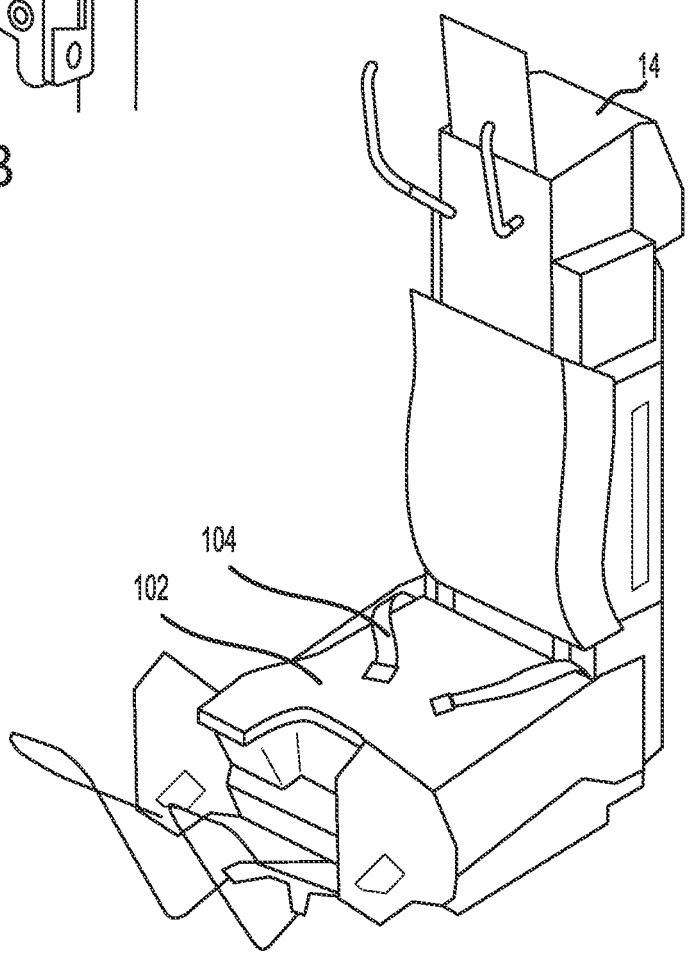
FIG. 2A illustrates an ejection seat having an electronic release system, in accordance with various embodiments.

Referring now to FIG. 2A, an ejection seat 14 is illustrated with an electronic release system 200, in accordance with various embodiments. The ejection seat 14 comprises a seat pan 102 and a lap belt 104 disposed thereon. The lap belt 104 is configured to secure an occupant 16 from FIG. 1 to the ejection seat 14. With reference now to FIG. 2B, the lap belt 104 comprises a latch plate 112 and a latch 114. The latch plate 112 is configured to removably couple to the latch 114. In this regard, the latch plate 112 may engage the latch 114 and lock the lap belt in place to secure the occupant 16 from FIG. 1 into the ejection seat 14. In various embodiments, the ejection seat 14 comprises a pin 116 configured to secure the latch plate 112 to the latch 114 during operation of the aircraft 12 from FIG. 1. In this regard, the pin 116 may release the latch 114 from the latch plate 112 manually by an occupant 16 from FIG. 1 to release the occupant 16 from the ejection seat 14. In various embodiments, during an ejection event, the pin 116 is configured to automatically release to allow the occupant 16 from FIG. 1 to be decoupled from the ejection seat 14.

Figure 3:
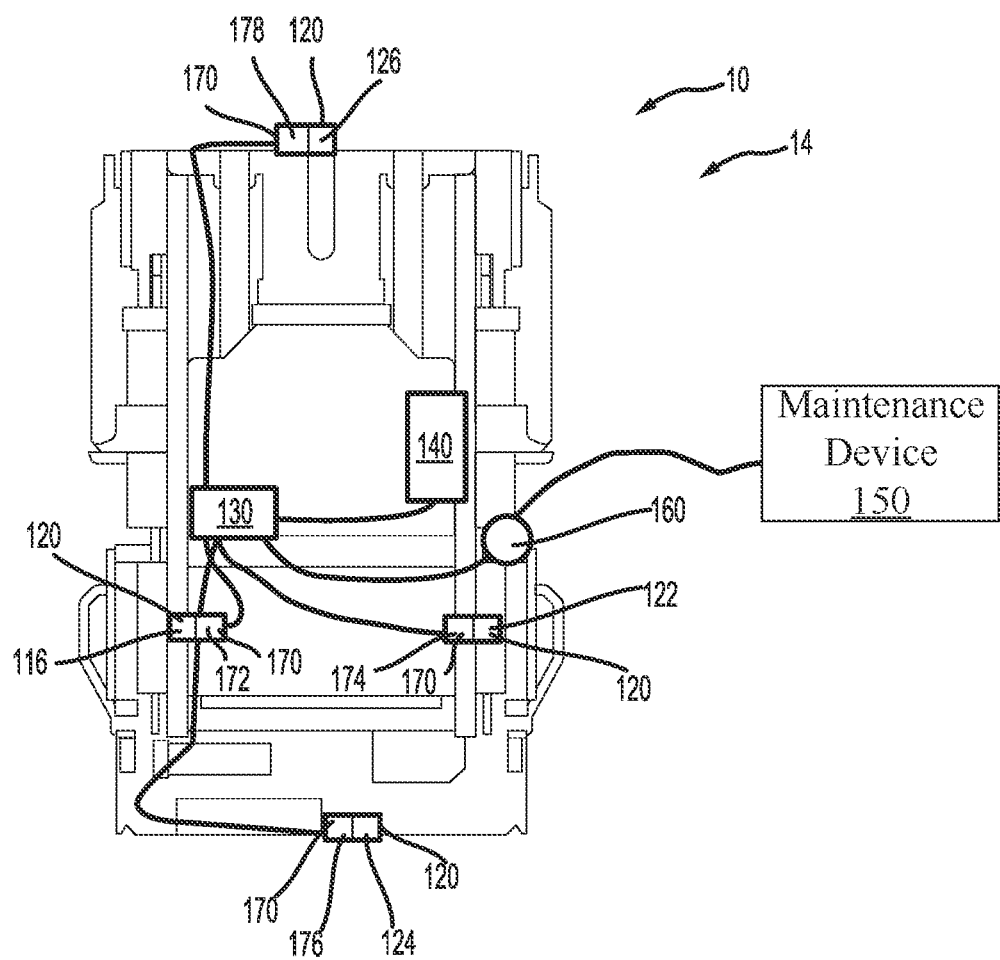
FIG. 3 illustrates an ejection seat having an electronic release system, in accordance with various embodiments.

Referring now to FIG. 3, a schematic view of the electronic release system 200 from FIGS. 1 and 2A, in accordance with various embodiments. The pin 116 of lap belt 104 may be one of a plurality of pins 120 of an ejection seat 14. For example, in various embodiments, the plurality of pins 120 may include the pin 116 disposed on a first side of ejection seat, a second pin 122 disposed on an opposite side of the ejection seat (i.e., for crossing lap belts), a third pin 124 disposed vertically below the pin 116 and the second pin 122, and a fourth pin 126 disposed vertically above the pin 116 and the second pin 122. In various embodiments, the third pin 124 may be configured to release a leg restraint and the fourth pin 126 may be configured to release a shoulder restraint of the ejection seat 14. Although only four pins are illustrated, the present disclosure is not limited in this regard. For example, the plurality of pins may include additional pins configured to release an arm restraint release, a helmet mounted display release, a passive head and neck protection release, etc. Any number of pins may be released simultaneously to release a subsystem, release an occupant 16 from ejection seat 14 of FIG. 1 after an ejection event, or aid in releasing an occupant 16 from ejection seat 14, in accordance with various embodiments. In various embodiments, anywhere there is a pressure actuated or mechanically released pin can be retrofitted in accordance with the electronic release system 200 as disclosed herein.

In various embodiments, the electronic release system 200 comprises a controller 130. In various embodiments, controller 130 may be integrated into computer systems of ejection seat 14. In various embodiments, controller 130 may be configured as a central network element or hub to access various systems and components of electronic release system 200. In various embodiments, controller 130 may comprise a processor. In various embodiments, controller 130 may be implemented in a single processor. In various embodiments, controller 130 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 130 may comprise a processor configured to implement various logical operations in response to execution of instructions, for example, instructions stored on a non-transitory, tangible, computer-readable medium configured to communicate with controller 130.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the electronic release system 200 comprises a plurality of release devices 170. Each release device in the plurality of release devices 170 corresponds to a respective pin in the plurality of pins 120. For example, a first release device 172 corresponds to the pin 116, a second release device 174 corresponds to the second pin 122, a third release device 176 corresponds to the third pin 124, and a fourth release device 178 corresponds to the fourth pin 126. Each release device in the plurality of release devices 170 comprises an electronically activated (i.e., wirelessly or wired) release device. For example, each release device in the plurality of release devices 170 may comprise an electric servomotor, an electric actuator, a solenoid, or any device configured to supply a retraction or releasing force to a respective pin in the plurality of pins 120.

In various embodiments, the controller 130 is in electronic communication (e.g., wirelessly or electrically) with the plurality of release devices 170. In this regard, as described further herein, the controller 130 may be configured to command the plurality of release devices 170 to provide a retraction or release force to the plurality of pins 120 during an ejection process. In various embodiments, the electronic release system 200 further comprises a sequence controller 140. Although illustrated as comprising controller 130 and sequence controller 140, the present disclosure is not limited in this regard. For example, the controller 130 may be integral with the sequence controller 140. In various embodiments, having the controller 130 separate from the sequence controller 140 may facilitate retrofit options for existing ejection systems, in accordance with various embodiments.

In various embodiments, the sequence controller 140 is disposed within the ejection seat 14. The sequence controller 140 is in electronic (i.e., wirelessly or electrically) communication with the controller 130. In various embodiments, the sequence controller 140 is configured to initiate a sequence of ejection events in response to receiving a reference control signal during an ejection event. In response to receiving the reference control signal, the sequence controller 140 may be configured to initiate a sequence of ejection events for the ejection seat 14 to conduct. For example, the sequence controller 140 may activate Vernier motors, yaw motors, man-seat separator systems, drogue parachute deployment, and/or main parachute deployment, etc. In various embodiments, the sequence controller 140 may further activate the plurality of release devices 170 through the controller 130 based on activating a certain ejection event, based on a time from ejection, or the like.

In various embodiments, the electronic release system 200 further comprises a maintenance port 160. The maintenance port 160 may be configured to couple to a maintenance device 150. The maintenance device 150 may be configured to open or close a release device in the plurality of release devices 170. In this regard, through the maintenance device 150, a release device in the plurality of release devices 170 may be commanded to release a pin in the plurality of pins 120 without releasing any of the remainder of pins in the plurality of pins. In contrast with mechanical systems, releasing one pin would also release all other pins due to their simultaneous release. In this regard, maintenance of the electronic release system may be more efficient and less time consuming relative to typical release systems.

Figure 4:
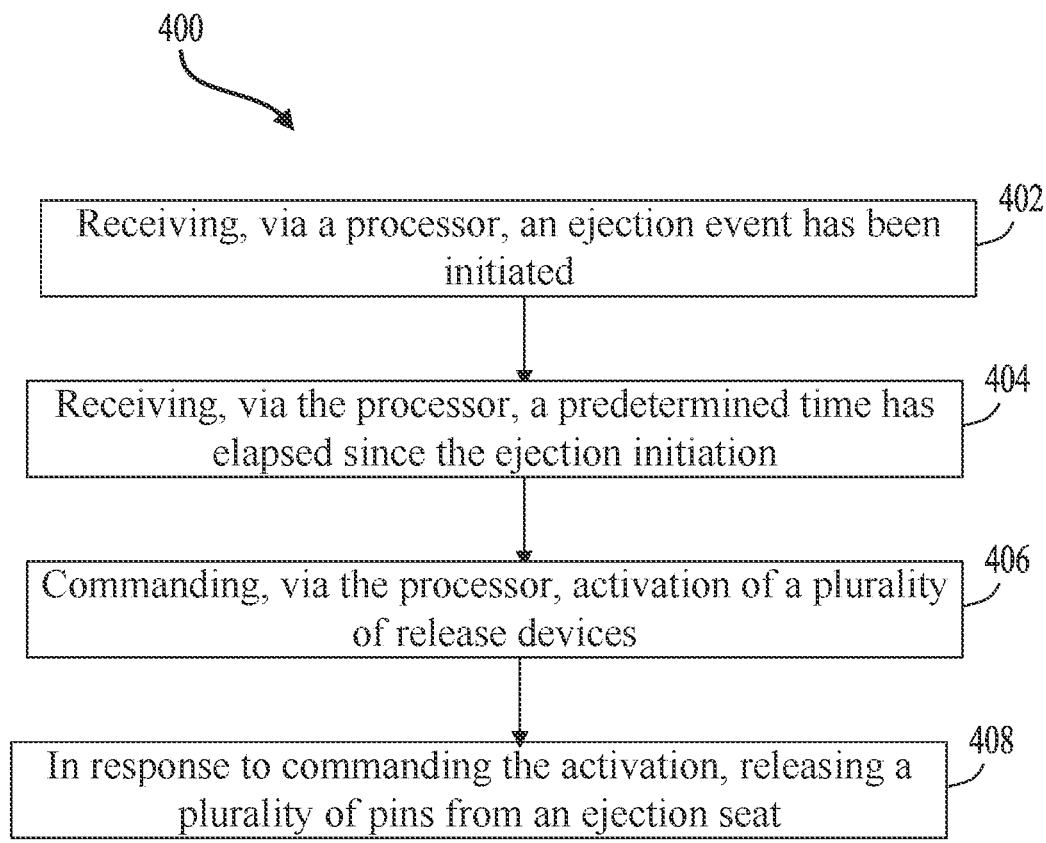
FIG. 4 illustrates a flow chart for a process of an electronic release system, in accordance with various embodiments.

Referring now to FIG. 4, a process 400 for controller 130 of the electronic release system 200 is illustrated, in accordance with various embodiments. The process 400 comprises receiving, via a processor, an ejection event has been initiated (step 402). In various embodiments, step 402 may be received from the sequence controller 140, or the like.

The process 400 further comprises receiving, via the processor, a predetermined time has elapsed since the ejection event has been initiated (step 404), and commanding, via the processor, activation of a plurality of release devices 170 (step 406). Although described herein with respect to receiving a predetermined time elapsing, the present disclosure is not limited in this regard. For example, commanding activation of the plurality of release devices in step 406 may be based on, or occur simultaneously with, another event in the ejection process, such as release of drogue parachute, or the like.

In various embodiments, in response to commanding the activation, the process 400 further comprises releasing a plurality of pins 120 from an ejection seat 14 (step 408). In various embodiments, the plurality of pins 120 may be released near simultaneously (i.e., within 2 seconds of each other, or within 1 second of each other). In this regard, in response to the plurality of pins 120 being released, an occupant 16 of an aircraft 12 from FIG. 1 may be released from the ejection seat 14 during descent towards the ground.

Figure 5:
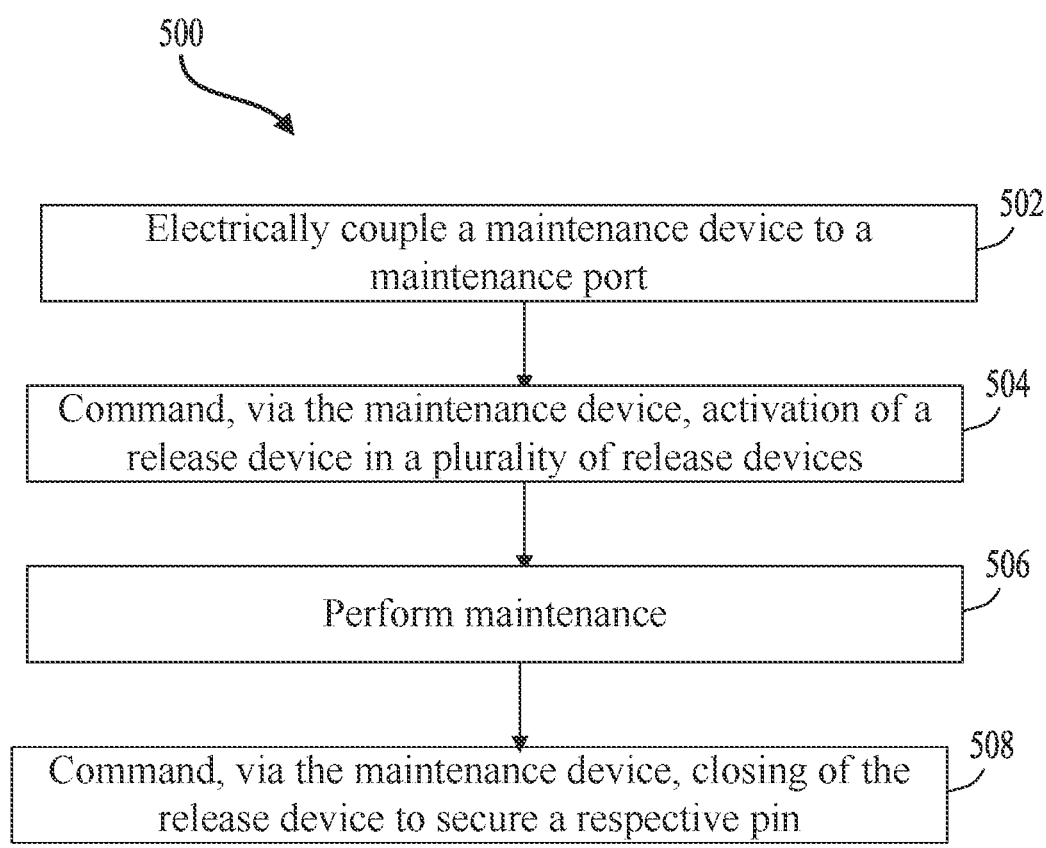
FIG. 5 illustrates a method for maintenance of an electronic release system, in accordance with various embodiments.

Referring now to FIG. 5, a maintenance method 500 for an electronic release system 200 is illustrated in accordance with various embodiments. The maintenance method 500 comprises electrically coupling a maintenance device 150 to a maintenance port 160 (step 502). The maintenance device may be any computing unit deployed as a user device, such as a tablet, a phone, embedded controls, integrated circuits, smartphones Internet of Things devices ("IoT" devices), etc. The maintenance port may be an electrical port, such as a universal serial bus (USB), or the like.

The maintenance method 500 further comprises commanding, through the maintenance device, activation of a release device in a plurality of release devices 170 (step 504). Each release device in the plurality of release devices 170 is associated with a respective pin in a plurality of pins 120 of an ejection seat 14 from FIG. 3.

The maintenance method 500 further comprises performing maintenance (step 506). Maintenance may be performed on the release device, the respective pin associated with the release device, or a component that interacts with the pin and the release device (e.g., a lap belt or the like).

The maintenance method 500 further comprises commanding, through the maintenance device closing of the release device to secure a respective pin (step 508). The respective pin may be the pin that was released in step 504 or may be a new pin (i.e., a replacement pin), in accordance with various embodiments. In various embodiments, the maintenance method 500 disclosed herein for an electronic release system 200 of an ejection system of an aircraft 12 from FIG. 1 may facilitate quicker, more efficient, and more cost effective maintenance relative to typical systems as described previously herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electronic release system for an aircraft ejection system, comprising:
   a controller;
   a plurality of release devices in operable communication with the controller;
   a plurality of pins, each pin in the plurality of pins operably coupled to a release device in the plurality of release devices, the controller configured to:
   receive an indication that an ejection event from an aircraft has been initiated,
   command activation of the plurality of release devices, and
   in response to commanding the activation, releasing the plurality of pins from an ejection seat.

2. The electronic release system of claim 1, further comprising the ejection seat.

3. The electronic release system of claim 1, wherein the plurality of pins includes a first pin configured to release a lap belt during releasing the plurality of pins.

4. The electronic release system of claim 3, wherein the plurality of pins include a second pin configured to release a leg restraint during releasing the plurality of pins.

5. The electronic release system of claim 1, wherein releasing each pin in the plurality of pins occurs within one second of each other.

6. The electronic release system of claim 1, wherein the controller is further configured to receive a second indication a predetermined time has elapsed since the ejection event was initiated.

7. The electronic release system of claim 1, further comprising a lap belt, a first pin in the plurality of pins configured to secure the lap belt during operation of the aircraft.

8. The aircraft comprising the electronic release system of claim 1.

9. An electronic release system for an aircraft ejection system, comprising:
   a controller;
   a maintenance electrical port in electrical communication with the controller;
   a plurality of pins configured to be released during an ejection event;
   a plurality of release devices in electronic communication with the controller, each release device in the plurality of release devices in operable communication with a pin in the plurality of pins, the controller configured to:
   receive a command to release a first release device in the plurality of release devices; and
   command release of the first release device in the plurality of release devices, a remainder plurality of release devices remaining un-released.

10. The electronic release system of claim 9, wherein the controller is further configured to:
    receive an indication that the ejection event from an aircraft has been initiated,
    command activation of the plurality of release devices, and
    in response to commanding the activation, releasing the plurality of pins from an ejection seat.

11. The electronic release system of claim 10, wherein releasing each pin in the plurality of pins occurs within one second of each other.

12. The electronic release system of claim 9, further comprising an ejection seat, the controller disposed within the ejection seat.

13. The electronic release system of claim 9, wherein the plurality of pins includes a first pin configured to release a lap belt during releasing the plurality of pins.

14. The electronic release system of claim 9, wherein the controller is further configured to:
    receive a second command to close the first release device; and
    command the first release device to close in response to receiving the second command.

15. A method, comprising:
    receiving, via a processor, an indication that an ejection event from an aircraft is initiated;
    commanding, via the processor, activation of a plurality of release devices to supply a retraction force to a plurality of pins; and
    in response to activation of the plurality of release devices, releasing the plurality of pins from an ejection seat of the aircraft.

16. The method of claim 15, wherein an occupant is released from the ejection seat in response to releasing the plurality of pins.

17. The method of claim 15, wherein releasing each pin in the plurality of pins occurs within one second of a remainder of pins in the plurality of pins being released.

18. The method of claim 15, further comprising receiving, via the processor, a predetermined time has elapsed since the ejection event was initiated.

19. The method of claim 18, wherein commanding activation of the plurality of release devices is in response to the predetermined time elapsing.

20. The method of claim 15, wherein releasing the plurality of pins includes releasing a lap belt, a leg restraint, and a shoulder harness.

\* \* \* \* \*